United States Patent
Sharma et al.

(10) Patent No.: US 7,720,720 B1
(45) Date of Patent: May 18, 2010

(54) SYSTEM AND METHOD FOR GENERATING EFFECTIVE RECOMMENDATIONS

(75) Inventors: Nirad Sharma, Austin, TX (US);
Michael K. Grant, Austin, TX (US);
Neil C. Thier, Austin, TX (US); Alex Devine, Austin, TX (US); Sherrill J. Packebush, Austin, TX (US); Thomas H. Dillon, Austin, TX (US); James Singh, Austin, TX (US); Jeremy S. Wacksman, Evanston, IL (US); Chris Hyams, Austin, TX (US); Timothy P. Darr, Bristow, OK (US)

(73) Assignee: Versata Development Group, Inc., Austin, TX (US)

( * ) Notice: Subject to any disclaimer, the term of this patent is extended or adjusted under 35 U.S.C. 154(b) by 1686 days.

(21) Appl. No.: 10/912,734

(22) Filed: Aug. 5, 2004

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 5,765,143 A | 6/1998 | Sheldon et al. | 705/28 |
| 6,412,012 B1* | 6/2002 | Bieganski et al. | 709/232 |
| 6,470,324 B1 | 10/2002 | Brown et al. | 705/28 |
| 6,636,836 B1* | 10/2003 | Pyo | 705/26 |
| 6,711,550 B1 | 3/2004 | Lewis et al. | 705/10 |
| 6,836,773 B2* | 12/2004 | Tamayo et al. | 707/6 |
| 7,475,027 B2* | 1/2009 | Brand | 705/26 |
| 2003/0009456 A1 | 1/2003 | Shintani et al. | 707/6 |
| 2003/0023591 A1 | 1/2003 | Ma et al. | 707/6 |
| 2003/0217055 A1 | 11/2003 | Lee et al. | 707/6 |
| 2003/0236785 A1 | 12/2003 | Shintani et al. | 707/6 |
| 2004/0049504 A1 | 3/2004 | Hellerstein et al. | 707/5 |
| 2008/0189253 A1* | 8/2008 | Oliver et al. | 707/3 |

OTHER PUBLICATIONS

R. Agrawal et al., "Mining Association Rules Between Sets of Items in Large Databases," Proceedings of ACM SIGMOD Int'l Conference on Management of Data, pp. 207-216 (1993).

J. Han et al., "Mining Frequent Patterns Without Candidate Generation," Proceedings of ACM SIGMOD Int'l Conference on Management of Data, pp. 1-12 (2000).

(Continued)

*Primary Examiner*—Mila Airapetian
(74) *Attorney, Agent, or Firm*—Hamilton & Terrile, LLP; Michael Rocco Cannatti (57) ABSTRACT

A data processing system generates recommendations for on-line shopping by scoring recommendations matching the customer's cart contents product page, configuration page, email and/or history using predetermined scoring criteria, such as item availability, item price, relevance of the item to the customer, item clarity, item exposure, total purchase amount in the cart, margin, recommendation confidence and lift, shopper profile matches, seasonality, customer history, time dependency, product marketing emphasis, substitutability, item popularity and/or product attributes associated with the recommended item. The scored recommendations may be ranked and/or filtered to prioritize the recommendations so that the best recommendation is selected for presentation to the customer. In addition, one or more scoring criteria or product attributes for the recommended item may be used to select a specific selling point/message text for inclusion with the selected recommendation.

22 Claims, 3 Drawing Sheets

OTHER PUBLICATIONS

J. Han et al., "Mining Frequent Patterns Without Candidate Generation," ftp://ftp.fas.sfu.ca/pub/cs/han/slides/almaden00/ppt.

U.S. Appl. No. 10/099,404, filed Mar. 15, 2002, Darr. et al.

B. Goethals, "Survey on Frequent Pattern Mining," HIIT Basic Research Unit, Department of Computer Science, University of Helsinki, Finland (2003).

"Association Rule Mining," COMP 290-90 Seminar, University of North Carolina at Chapel Hill, Fall 2003, http://www.cs.unc.edu/Courses/comp290-90-f03/associationrule1.pdf.

X. Shang, et al., "SQL Based Frequent Pattern Mining Without Candidate Generation" (Poster Abstract) ACM Symposium of Applied Computing, pp. 618-619 (Mar. 2004).

X. Shang, et al., "SQL Based Frequent Pattern Mining With FP-Growth," Proc. 15th Int. Conference on Applications of Declarative Programming and Knowledge Management, Berlin, Germany, 2004, http://wwwiti.cs.uni-magdeburg.de/~geist/publications/inap2004.pdf.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec1.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec2.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec3.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec4.ppt.

AMR Research Alert, "Getting Away from No-brainer with Cross-sell and Upsell Strategies," Sep. 2, 2003.

* cited by examiner

SYSTEM AND METHOD FOR GENERATING EFFECTIVE RECOMMENDATIONS

BACKGROUND OF THE INVENTION

1. Field of the Invention

The present invention relates in general to the field of database analysis. In one aspect, the present invention relates to a system and method for generating purchase recommendations based on historical transaction data.

2. Description of the Related Art

Conventional sales practices often use sales or service representatives to assist in the customer's purchasing decisions by recommending particular products or features to the customer. An experienced sales or service representative will be able to recommend specific purchases by first taking into consideration the customer's stated preferences.

In addition, a vendor who sells computer systems to a variety of customers (e.g., individual home users interested in personal computers, businesses interested in client/server systems, etc.) must recommend an optimal configuration of computer features and/or related products to meet the customer's particular needs, where a "configuration" is a collection of constituent parts that comprise an end product or service, and a "product" may comprise one or more physical objects or one or more services or any combination of products and services. In this case, the recommendation of a particular system configuration may depend on the external needs of the customer, such that a recommended configuration has a certain amount of disk space storage, a certain number of disk drives, choice of monitor, and the like to meet the desired level of functionality or price/performance desired by the customer.

An experienced sales or service representative will also be able to recommend specific purchases by taking into consideration the historical purchasing patterns of other customers, such that a recommendation is based on historical transaction data indicating that, when other customers have purchased product or feature X, they also purchased product or feature Y (which would be recommended to the customer). Now that modern computers can assemble, record and analyze enormous amounts of data, historical transaction data can be collected and analyzed using data mining techniques to discover association relationships in a database by identifying frequently occurring patterns in the database. These association relationships or rules may be applied to extract useful information from large databases in a variety of fields, including selective marketing, market analysis and management applications (such as target marketing, customer relation management, market basket analysis, cross selling, market segmentation), risk analysis and management applications (such as forecasting, customer retention, improved underwriting, quality control, competitive analysis), fraud detection and management applications and other applications (such as text mining (news group, email, documents), stream data mining, web mining, DNA data analysis, etc.). Association rules have been applied to model and emulate consumer purchasing activities by describing how often items are purchased together. Typically, a rule consists of two conditions (e.g., antecedent and consequent) and is denoted as A⟹C where A is the antecedent and C is the consequent. For example, an association rule, "laptop⟹speaker (80%)," states that four out of five customers that bought a laptop computer also bought speakers.

Conventional data mining approaches use generic item descriptions, such as the SKU (stock-keeping unit number) when identifying items or products in a transaction database. When these generic descriptions are used to identify frequent sets, the frequent sets are not large and power-set/rule generation is tractable. However, conventional data mining techniques using item data at the SKU level do not provide sufficient information to develop meaningful association rules for complex products. For example, if there are three transactions involving the purchase of a computer identified as "Desktop-SKU" with one of the transactions also involving the purchase of DVD disks, the product level of description used to identify the computer does not reveal that two of the computers did not include DVD drives, while the third computer (which was purchased with the DVD disks) did include a DVD drive. As this example demonstrates, this lack of granularity in the item description diminishes the quality of association rules that can be generated, resulting in limited pattern correlation.

The difficulty of making recommendations increases as the number and complexity of mined association rules increases, which in turn is caused by an increase in the number of services and/or products, where each service or product may itself comprise a number of constituent services and products. The complexity of recommending a suitable configuration grows further with the number of constituent parts, the external needs of the customer, and the internal needs of the parts when considered as a whole. With the increasing amount of transaction data that may be accumulated and processed to generate an increasing number of associations rules, there can be an overwhelming number of recommendations available for presentation to the customer. As a result, the customer can be confused or overwhelmed if too many recommendations are made, if the recommendation is not adequately explained or if the recommendation fails to take into account the customer's needs.

As seen from the conventional approaches, a need exists for methods and/or apparatuses for improving the use of data mining techniques in generating recommendations. There is also a need for finer granularity in the generation of frequent sets to better discover meaningful patterns without imposing the cost of a combinatorial explosion of the data that must be examined. In addition, there is a need for an improved method and system for efficiently generating retail recommendations which controls and focuses the presentation of recommendations to customers so that recommendations have an improved chance of being accepted by being presented in a compelling and coherent way. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for generating retail recommendations using an attribute-based recommendation domain model whereby inputs (such as customer purchase or profile information, catalog information, part information and historical transaction information) are normalized into an attribute-based representation. The normalized representations may be processed by a recommendation engine to identify candidate recommendation rules that match a user's indication of commercial interest (such as the shopping cart contents, history or other recommendation context for a user). Each consequent for each matching candidate rule is then processed to identify specific and actionable item descriptions (such as part numbers from a catalog) that meet the requirements of the consequent. Sometimes, multiple item descriptions are identified for each consequent. Then, the candidate rules and their identified item descriptions are ranked using selected scoring criteria (such as margin or expected margin) to select and prioritize the candidate recommendation rules. For the highest ranked rule(s), a profile estimate is then used to generate a targeted selling point corresponding to a key attribute of the recommended item. In addition, a system and method are provided for generating specific and relevant recommendations by prioritizing matching specific recommendations using the recommendation context, recommendation strength, customer history, financial information pertaining to the quote or recommendation, and/or customer profile information to score the matching recommendations. The scored recommendations may then be sorted and filtered to select the best recommendations. A recommendation message generator issues one or more compelling selling messages based on message selection criteria, such as the current recommendation context, estimated profile, individual customer history, and/or specific attributes of the item being recommended.

The objects, advantages and other novel features of the present invention will be apparent from the following detailed description when read in conjunction with the appended claims and attached drawings.

DETAILED DESCRIPTION

An improved method and apparatus are described for generating attribute-based recommendations using selected scoring criteria to prioritize matching recommendations and to create dynamic and compelling selling point messages that are customer and product specific. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
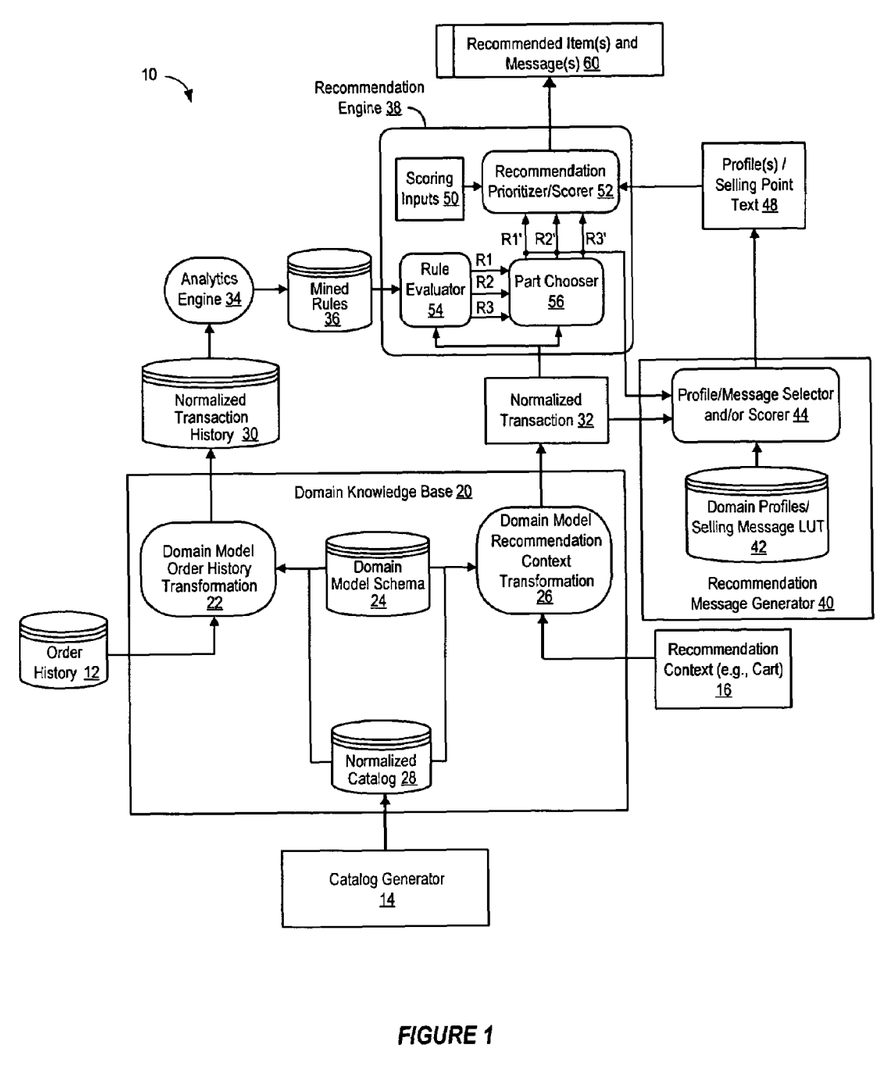
FIG. 1 illustrates an exemplary recommendation system for creating relevant and specific recommendations using high-resolution part and order history information that has been transformed into a normalized domain model representation.

Referring now to FIG. 1, a block diagram illustrates an exemplary recommendation system 10 for creating and prioritizing relevant and specific recommendations by mapping or otherwise transforming one or more input data sets of transaction information (e.g., order history information, catalog information and/or customer order-related information) into a second data set of transaction information (e.g., normalized transaction history, normalized catalog and/or normalized transaction data) that provides more detailed information specifying the attributes of the purchased product. In a selected application, the second data set of transaction information may be used to generate cross-sell and up-sell recommendations based on frequent patterns mined from an order history stored in a transaction database. By providing greater granularity to the transaction data, pattern correlation is improved by representing items in terms of their features so that a part or product may be represented in terms of its part group and various attribute-value pairs. For example, if there are three transactions involving the purchase of a computer with the third transaction also involving the purchase of DVD disks, by including an identification for each computer item of whether it includes a DVD drive (e.g., Computer.DVDrive.No for the first and second computers and Computer.DVDrive.Yes for the third computer), sufficient detail is provided to enable more accurate correlation between the computer and disk purchases when generating association rules. By transforming the input data set(s) to a shared or normalized representation, a common domain model or representation of the various input data sets is provided that can be used to generate one or more recommendations along with an associated selling point message.

In the example depicted in FIG. 1, the recommendation system 10 generates recommendations using a catalog generator 14, a domain knowledge base 20 for generating normalized transaction data 30, 32, an analytics engine 34 for generating mined rules 36, a recommendation message generator 40 and a recommendation engine 38 for generating recommendations 60 containing a sales message text 48. The catalog generator 14 is used to generate a normalized catalog 28, which represents the catalog of parts in terms of the part attributes of the common domain of the recommendation system 10. The domain knowledge base 20 includes a domain model schema 24 and the normalized part catalog 28. In addition, transformation processes 22, 26 are included in the domain knowledge base 20 for transforming the order history 12 and recommendation context data 16 into the normalized transaction history 30 and normalized transaction 32, respectively. These normalized representations 30, 32 are used to generate rules and appropriate selling point text that are processed by the recommendation engine 38 which issues the recommendation(s) 60. In particular, the recommendation engine 38 evaluates which association rules 36 match the normalized transaction 32, completes the matching rules (e.g., R1) by choosing one or more catalog parts that satisfy the rule (e.g., R1') and ranks the completed rules (e.g., R1', R2', R3'). For example, each rule may be scored on the basis of the margin for the recommended item, or on the basis of the expected margin (margin x confidence) for the rule, or on the basis of a scoring equation that uses a margin value factor, a confidence value factor and one or more predetermined scoring criteria factors to form a score product of the factors. Alternatively, the matching, completed rules may be filtered to remove rules not meeting a recommendation strength threshold (e.g., confidence threshold of 90%) and then scored on the basis of margin or expected margin. The recommendation message generator 40 uses the normalized transaction representation 32 as an input to the profile selection process 44 which, in response to an identified recommendation, retrieves or calculates a profile estimate corresponding to the customer and/or recommendation. The profile estimate may then be used to retrieve a lead in text and a plurality of selling text messages for that profile, and one of the selling text messages is selected based on an attribute of the recommended item. The selected profile and/or selling point text 48 are provided to the recommendation engine 38. As will be appreciated, a selling message can be selected after the rule scoring process for the winning rule(s), or can be selected for each matching rule before the rule scoring process, thereby allowing the selling message to factor into the rule scoring.

In operation, the recommendation system 10 inspects the user's recommendation context 16 (such as items in a user's shopping cart, a product page being viewed by the customer on the web, a configuration page, an e-mail sent as part of a marketing campaign and/or the user's session history) and recommends additional up-sell or cross-sell items, thereby increasing some financial metric, such as the total order size and/or the profit margin of the order. One approach for determining what item(s) to recommend is to analyze historical order history 12 for associations among previously purchased items. This approach is based on the idea that groupings of previously purchased items are a good predictor of what users are likely to buy in the future. As will be appreciated, the order history 12 may include the orders and/or abandoned carts over some period of interest. Another approach for determining what items to recommend involves using a known, self-selected customer profile that the user specifies when they register or login to a site. A third approach for determining what items to recommend is to use click-path or session information to infer what recommendations might be compelling for a given user.

To obtain more meaningful predictions from the order history 12 (which is typically referenced to generic product descriptors, such as the SKUs), the order history data 12 may be mapped or otherwise transformed into normalized transaction history data 30 that provides more detailed information identifying with greater specificity the attributes of the purchased products identified in the order history 12. The transformation module 22 performs the normalization by using the normalized catalog 28 and the domain model schema 24 to transform the native order history data 12 into a normalized transaction history 30.

In particular, the domain model schema component 24 contains product detail knowledge (including definitions of part groups, features, functions, attributes and the like) that specifies various product feature details for each transaction item in the order history 12 and recommendation context 16, thereby providing all of the information needed in the recommendation domain that is relevant for recommendation decision-making. As will be appreciated, part group information refers to collections of parts with similar characteristics or functions, where parts may be considered to be the artifacts for sale, singly or in bundles, or that otherwise appear in a configuration. In addition, attributes are the properties for describing the parts within some context (such as the specifications of the part displayed on a web page), while functions are a description of the capability or usage of a part, such as the function of a part that has already been purchased and placed in the cart or some other recommendation context 16 that can be used in the recommendation process to eliminate recommendations that perform the same function. In effect, the domain model schema component 24 provides the knowledge that an expert in the field might use to identify relevant and specific recommendations; this is meant to reflect as closely as possible the true mental model and decision criteria of a customer. This correspondence between the schema and a customer mental model will greatly improve the relevance of recommendations. An example of such an expert would be a high-performing salesperson at a consumer electronics retail store, or a similarly skilled call-center employee at a consumer electronics OEM. For example, part number information for an item in the order history 12 may be mapped to a part group identifier and to a set of attribute names and values retrieved from the domain model schema component 24, and this transformed information may then be stored as normalized transaction data 30 in the database. The domain model schema component 24 is also used to convert a recommendation context (such as a real-time order or cart selection) into a representation that can be used to select the appropriate recommendation(s). The domain model schema 24 described herein is used to transform a recommendation context 16, an order history 12 and the parts in the catalog currently for sale into a representation that can be used by an analytics or recommendation engine to create rules and recommendations. Additional details and examples of how a domain model schema may be used to normalize the representation of product information for purposes of generating recommendations are set forth in U.S. patent application Ser. No. 10/912,743, entitled "Retail Recommendation Domain Model," filed Aug. 5, 2004, and assigned to Trilogy Development Group, which is hereby incorporated by reference in its entirety.

Data mining techniques may then be used to identify attribute-based associations contained in the normalized transaction history 30 and to generate rules 36 which are used by the recommendation engine 38 to make recommendations to a user. In particular, the analytics engine 34 generates attribute-based rules 36 using the normalized transaction history data 30 generated by the order history transformation module 22, and the mined rules 36 are provided to the rule evaluator 54 in the recommendation engine 38. In response to the normalized transaction data 32, the rule evaluator 54 determines which of the mined rules (e.g., R1, R2, R3) match the recommendation context 16 (as represented by the normalized transaction 32) and may also filter out any rules not meeting a confidence threshold requirement. A part chooser 56 may be used to evaluate the consequent of each matching rules (e.g., R1) in an attempt to generate at least one specific part to complete the recommendation rule (e.g., R1') that satisfies the constraint(s) of the consequent. Thus, the part chooser 56 builds lists of parts from the normalized catalog 28 that satisfy the requirements of the consequent. If more than one part from the catalog satisfies the consequent, then multiple rules (e.g., R1' and R2') are issued by the part chooser 56. Each completed recommendation rule (e.g., R1', R2', R3') may be provided to the recommendation message generator 40 (to assist with selection of the selling point text, as described below) and to the recommendation prioritizer 52 which scores and filters the completed, matching recommendations to choose the recommendations that have the best chance of being accepted by the user. The recommendation rule or part with the highest score is defined to be the "best" part, where "best" may be determined by the implementer. In a selected embodiment, one or more scoring criteria or considerations 50 are used by the prioritizer 52 to score each recommendation rule. The scored recommendations (and each associated selling text 48, described below) may then be sorted, filtered or otherwise processed to output the specific recommendations 60. Alternatively, the completed rules (e.g., R1', R2', R3') may first be scored and ranked to identify the winning or highest ranked rules, so that only the winning rules are provided to the message generator 40.

In similar fashion, the recommendation context is transformed into normalized transaction data 32 by the domain model recommendation context transformation module 26, which receives as inputs the native recommendation context data 16, the normalized catalog 28, and the domain model schema 24. As will be appreciated, the recommendation context data 16 may include the current quote or order under consideration by a user, as well as previously ordered items, viewed items or other session-related information from the customer. The normalized transaction data 32 may be used by a profile selection module 44 to select a profile that matches with the user, or to compare a plurality of user profiles from the domain profile database 42 with the normalized recommendation context to quantify the extent each user profile matches the normalized recommendation context. For example, a profile selection process could inspect the recommendation context (e.g., a cart) 16 for predetermined items (e.g., items A and B) and increment a predetermined profile (e.g., Profile 1) by an amount (e.g., 0.5) if the cart contained the items. At the end, the profile with the highest score wins. In the recommendation message generator 40 (either before or after the matching recommendation rules are selected, completed and scored), the profile selector 44 uses the profile estimate that best matches the normalized transaction 32 to select one of a plurality of selling messages stored in the domain profile database 42, based on an attribute of the recommended item from the completed recommendation rule (i.e., the recommended product) and/or other scoring criteria 50 (such as a message strength score associated with each selling message in the database 42). The selected selling message is issued as the selling point text 48 for the completed recommendation rule. As a result, a profile and selling point text 48 may be returned for each completed recommendation rule, and may be combined to generate a recommendation 60 having a high probability of being accepted by the user. Alternatively, a selling point text 48 may be returned for only the completed recommendation rule that has been selected for issuance as a recommendation by the scoring process, thereby avoiding the need to process selling point text messages for recommendation rules that are not issued.

Figure 2:
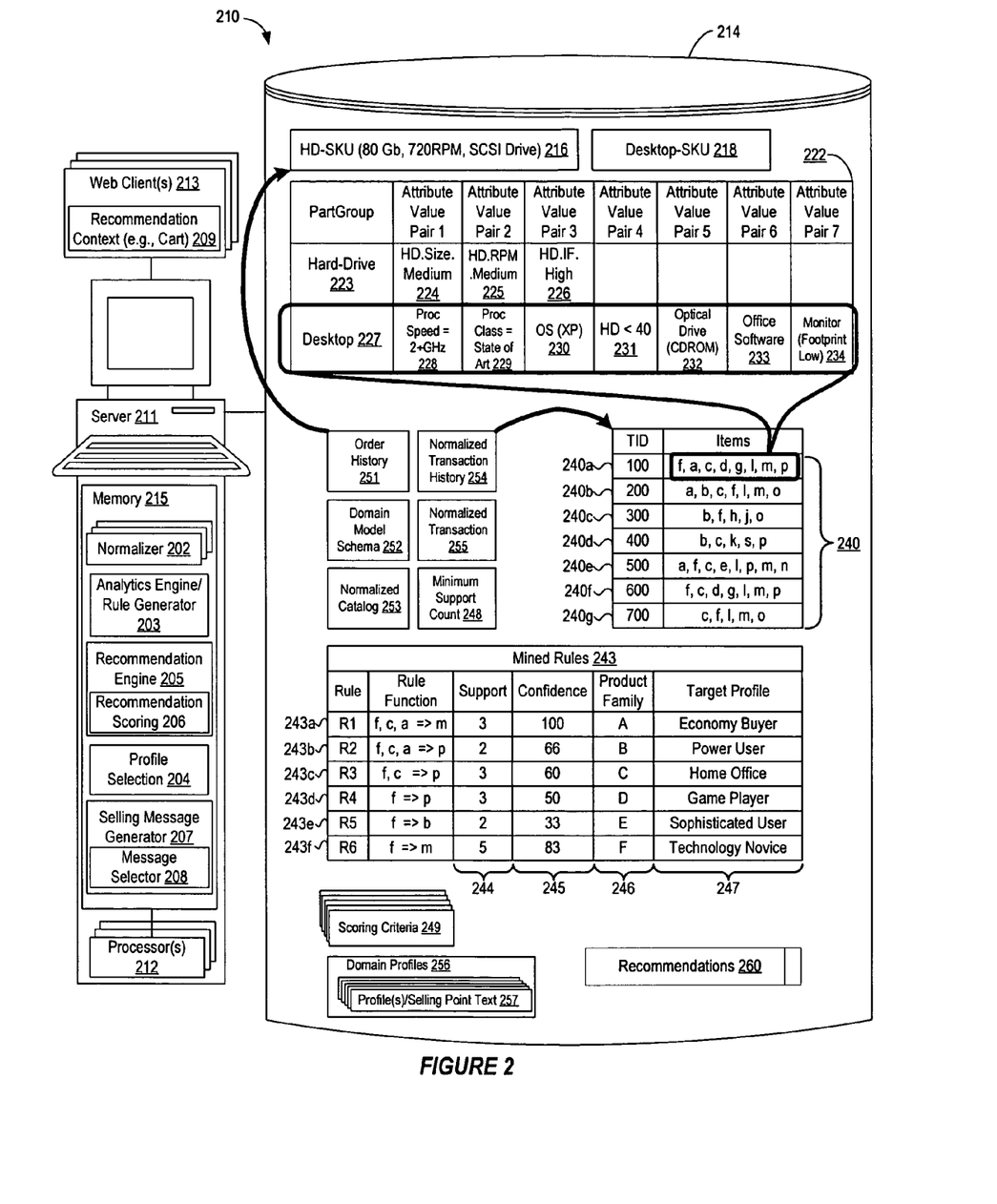
FIG. 2 illustrates a data processing system for generating prioritized recommendations and associated selling messages using an exemplary computer parts domain knowledge base.

FIG. 2 illustrates a data processing system for generating prioritized recommendations and associated selling messages using an exemplary computer parts domain knowledge base implemented with a data processing system 210 (e.g., a private wide area network (WAN) or the Internet) that includes a central server computer system 211 and one or more networked client or server computer systems 213 that are connected to the network. Communication between central server computer system 211 and the networked computer systems 213 typically occurs over a network, such as a public switched telephone network over asynchronous digital subscriber line (ADSL) telephone lines or high-bandwidth trunks, for example, communications channels providing T1 or OC3 service. Networked client computer systems (e.g., 213) typically access central server computer system 211 through a service provider, such as an internet service provider ("ISP") by executing application specific software, commonly referred to as a browser, on the networked client computer systems 213.

In a selected embodiment, a first data set of transaction information is stored in a database 214 that may be accessed directly or indirectly by the server 211. In this example, the first data set identifies the items included in one or more transactions (such as contained in the native order history 251) by including a generic product descriptor 216, 218 for each transaction item, such as the SKU for a purchased product. Thus, a hard drive that was purchased is identified with the hard drive SKU 216 and a desktop computer is identified with the desktop SKU 218. In addition or in the alternative, the first data set of transaction information identifies the recommendation context associated with the user cart 209.

In accordance with an embodiment of the present invention described herein, a transformation or normalizer process 202 maps or otherwise transforms the first data set of transaction information into a second data set of transaction information that provides more detailed information identifying with greater specificity the attributes of the specified product(s). As indicated, if only one of the input data sets (e.g., the cart data 209) requires normalization, then a single normalizer process 202 is used, but if the order history data 251 or the native catalog data (not shown) requires normalization, then separate instances of the normalizer process 202 may be used. In a selected embodiment, the data transformation is implemented with a computer or other data processing functionality (e.g., server 211) which loads a copy of the first data set (e.g., 216, 218 from a database 214) into local memory (e.g., 215). As will be appreciated, the first data set may represent items from the customer cart 209, or may represent items from prior transactions in the order history database 251. Using a product detail knowledge database (such as contained in the domain model schema 252) and/or the normalized catalog database 253 that specify various product feature details for each transaction item, the server 211 invokes the normalizer process 202 to map or transform the generic product descriptors of the first data set (e.g., 216, 218) into a second data set (e.g., 254) that specifies additional details and/or features for the item of interest, such as more detailed product descriptor information. In the depicted embodiment, part numbers in an order (e.g., 216, 218) may be mapped to a part group identifier and to a set of attribute names and values (e.g., 223-226, 227-234, respectively) and stored in the database 214. For example, an 80 Gb, 7200 RPM, SCSI drive identified with the HD-SKU 216 could be mapped to the following numerical, attribute-based transaction items:

_Hard_Drive
_Hard_Drive._Size. 80 Gb
_Hard_Drive._RPM. 7200
_Hard_Drive._Interface.SCSI In accordance with the invention described herein, the transformation of the native cart or order history data may also use qualitative or time-variant attribute values to represent the normalized data. Such time-variant attribute values can be useful where the relevancy of recommendations, whether automatically or manually generated, can expire over time as new technologies appear or new products are offered. For example, a processor that was the highest performing in its class six months ago is no longer the highest performing in its class today. As a result, the recommendations generated six months ago may no longer be useful if the changes to the product offering and technology over time are not taken into account. Manual recommendation updates are burdensome in requiring, at one extreme, replacement of outdated recommendations with new, but similar, recommendations, and at the other extreme, modifying existing recommendations. To address this problem, the domain knowledge base (e.g., domain knowledge base 20 in FIG. 1) may also include a transformation process for adjusting the values of attributes in the normalized data sets 28, 30, 32 to account for the changing technologies and product offerings over time. Products that were "high performance" or products that were "state-of-the-art" at the time the recommendations were originally generated may be adjusted to "moderate performance" or "middle-of-the-road technology." For example, an 80 Gb, 7200 RPM, SCSI drive identified with the HD-SKU 216 could be mapped to the following qualitative, attribute-based transaction items:

_Hard_Drive
_Hard_Drive._Size. Medium
_Hard_Drive._RPM. Medium
_Hard_Drive._Interface.High These items are included in a second data set 222 (also identified in FIG. 2 as the normalized transaction history 254) as an entry 223-226 which quantifies the consumer preferences for one or more products and associated product features and which is organized or stored in a structured format, such as a database or table. In this example, the original item description 216 is now expanded and represented by a Part Group identifier 223 and three attribute items 224, 225, 226. In similar fashion, the original item description 218 for a desktop computer is expanded and represented by a Part Group identifier 227 and seven attribute items 228-234 (in this example) that are stored as an entry in the second data set 222. These additional attribute items 228-234 specify the processor speed 228, processor class 229, operating system type 230, hard drive size 231, optical drive type 232, software package type 233, and monitor type 234 for the desktop item.

Because of the additional product detail information contained in the second data set (e.g., normalized transaction history 254), it can be used in transaction database applications to provide more meaningful frequent pattern analysis that is performed by the analytics engine 203. A broad variety of efficient algorithms for mining association rules have been developed in recent years, including algorithms based on the level-wise Apriori framework, TreeProjection and FPGrowth techniques. For example, association rules may be generated from the expanded second data set of transaction information that is included as part of a transaction database 240 representing the normalized transaction history 254, as indicated with entries 240a-g in FIG. 2. An important consideration with data mining applications is the representation of the transaction database 240. Conceptually, such a database can be represented by a binary two-dimensional matrix in which every row (e.g., 240a) represents an individual transaction (with a transaction identifier (e.g., TID 100)) and the columns represent the items in the transaction (e.g., f, a, c, d, g, l, m, p). Such a matrix can be implemented in several ways. The most commonly used layout is the horizontal data layout. That is, each transaction has a transaction identifier and a list of items occurring in that transaction. Another commonly used layout is the vertical data layout, in which the database consists of a set of items, each followed by its cover.

In the example of FIG. 2, the server 211 begins the process of generating association rules 243 by retrieving the item descriptors from the normalized transaction database 240 and a minimum support count 248. The server 211 then identifies all items in the database 240 with a frequency meeting or exceeding the minimum support count requirement (e.g., the minimum support count is 3), and uses a rule generator 203 (depending on the rule generation algorithm used) to generate a plurality of association rules 243a-f. Each association rule may include a support and confidence metric that is calculated by the server 211. For example, the support metric 244 is determined by the number of times the rule is supported in the transaction database 240, and the confidence metric 245 is determined by the percentage of times the antecedent of the rule leads to the consequent. In addition, each mined rule (e.g., R1 243a) may include a product family parameter 246 identifying the product family (e.g., Product Family "A") for the recommended item, and a target profile 247 for the rule identifying the likely user profile (e.g., Economy Buyer) for the recommended item.

Once the association rules 243 are finalized (which may optionally include an optimization to remove redundant rules), the recommendation engine 205 is invoked to process the recommendation context information generated by the cart 209 to identify potentially matching association rules which are to be further processed for possible issuance as recommendations 260. To this end, a normalizer process 202 may be executed to generate a normalized representation of the recommendation context 209 based on the domain model schema 252 and/or normalized catalog 253, which may be stored as a normalized transaction data set 255. The normalized transaction representation 255 may be used by the recommendation engine 205 to identify association rules from the mined rules 243 that match the recommendation context 209. For example, the recommendation engine 205 may include a rule evaluation process for evaluating the mined rules 243 against the normalized transaction representation 255 (e.g., [f, c]) to generate a list of candidate rules whose trigger evaluated to true (e.g., R1, R2, R3) in response to the recommendation context 209. In addition, the recommendation engine 205 may exclude any matching rules that do not meet a minimum confidence requirement, leaving only high confidence rules in the candidate rule set. From the list of matched candidate recommendation rules, each rule's consequent (e.g., consequent "m" from R1) may be further processed to identify one or more parts that satisfy the requirements of the consequent. For example, the recommendation engine 205 may include a part chooser process that builds lists of parts from the catalog 253 that satisfy the requirements of the consequent, thereby completing the recommendation rule (e.g., R1').

When a normalization process is used to transform the native cart and/or order history information, there can be many candidate recommendations produced for a given recommendation context. To avoid overwhelming the customer with recommendations, it may be desired to choose one or more recommendations (a configurable number) for display to the customer. This can be done by prioritizing the list of completed recommendation rules using a recommendation scoring process 206 which scores and sorts each completed recommendation rule using a predetermined scoring criteria 249, the goal being to select the recommendation rule(s) that will have the best chance of being accepted by the customer and/or that are advantageous to the retailer. For customers, the overriding criterion may be impact on price, while for retailers, the overriding criterion may be impact on margin. In accordance with the present invention, a variety of scoring criteria 249 may be used by the recommendation scoring process 206 when scoring and prioritizing recommendations, including but not limited to item availability, item price, relevance of the item to the customer, total purchase amount in the cart, margin, recommendation confidence and lift, shopper profile matches, seasonality, customer history, time dependency, product marketing emphasis and/or item popularity.

To illustrate an example use of the scoring criteria, a scoring equation may be used to calculate the margin or expected margin associated with each recommendation, and then the recommendations can be ranked to identify the one having the highest expected margin. Thus, the score or value of an individual candidate recommendation may be calculated with reference to the score equation, Score=Margin*Confidence, and a predetermined number of candidate recommendations having the highest score are selected for issuance as recommendation(s) 260.

In selected embodiments, a variety of scoring criteria may also be used to score the recommendations, such as availability, item price, total purchase amount in the cart, item or total cart margin, recommendation confidence and lift, strength of the selling message, shopper profile matches, seasonality, customer history, time dependency, product marketing emphasis, product attributes, and/or item popularity. In addition, when a group of recommendations are being chosen (instead of a single recommendation), a "non-substitutability" scoring criterion may be used to determine when a second recommendation would be merely cumulative of a first recommendation (i.e., substitutable), in which case the second recommendation should not be selected. For example, if a first recommendation, A (having the highest probability of being accepted), is chosen, then a second recommendation, B (having the next highest probability of being accepted), should not necessarily be chosen if A and B are similar and substitutable. If A is relevant, then so is B, but only one will be selected. If A is not relevant, then neither is B, and neither will be chosen. To address this scenario, a non-substitutability scoring criterion may be used by the recommendation scoring process 206 to prevent a recommendation (e.g., cumulative recommendation B) from being wasted.

Whichever scoring criteria are used to score the candidate recommendation rules, one or more recommendation rules or recommended items with the highest score is identified as the "best" part using whatever ranking scheme is chosen by the implementer. Thus, various embodiments of the present invention may be implemented by using one or more scoring criteria to prioritize the candidate recommendation rules. A variety of algorithms may be selected by the implementer for purposes of scoring the candidate recommendation rule by increasing and/or decreasing its score, depending on how the scoring criterion applies to the rule. For example, the score for a rule could be incremented by a predetermined or scaled value each time the scoring criterion indicates that the recommendation would be accepted, where the value of the increment may be a uniform value or may differ from criterion to criterion, depending on the scoring criterion applied. In addition or in the alternative, the score for a rule could optionally be decremented by a predetermined or scaled value each time the scoring criterion indicates that the recommendation would not be accepted. In addition to a simple increment and/or decrement approach, other scoring equations may be used that involve scoring criterion that are scaled, divided, summed, subtracted or otherwise mathematically manipulated.

Figure 3:
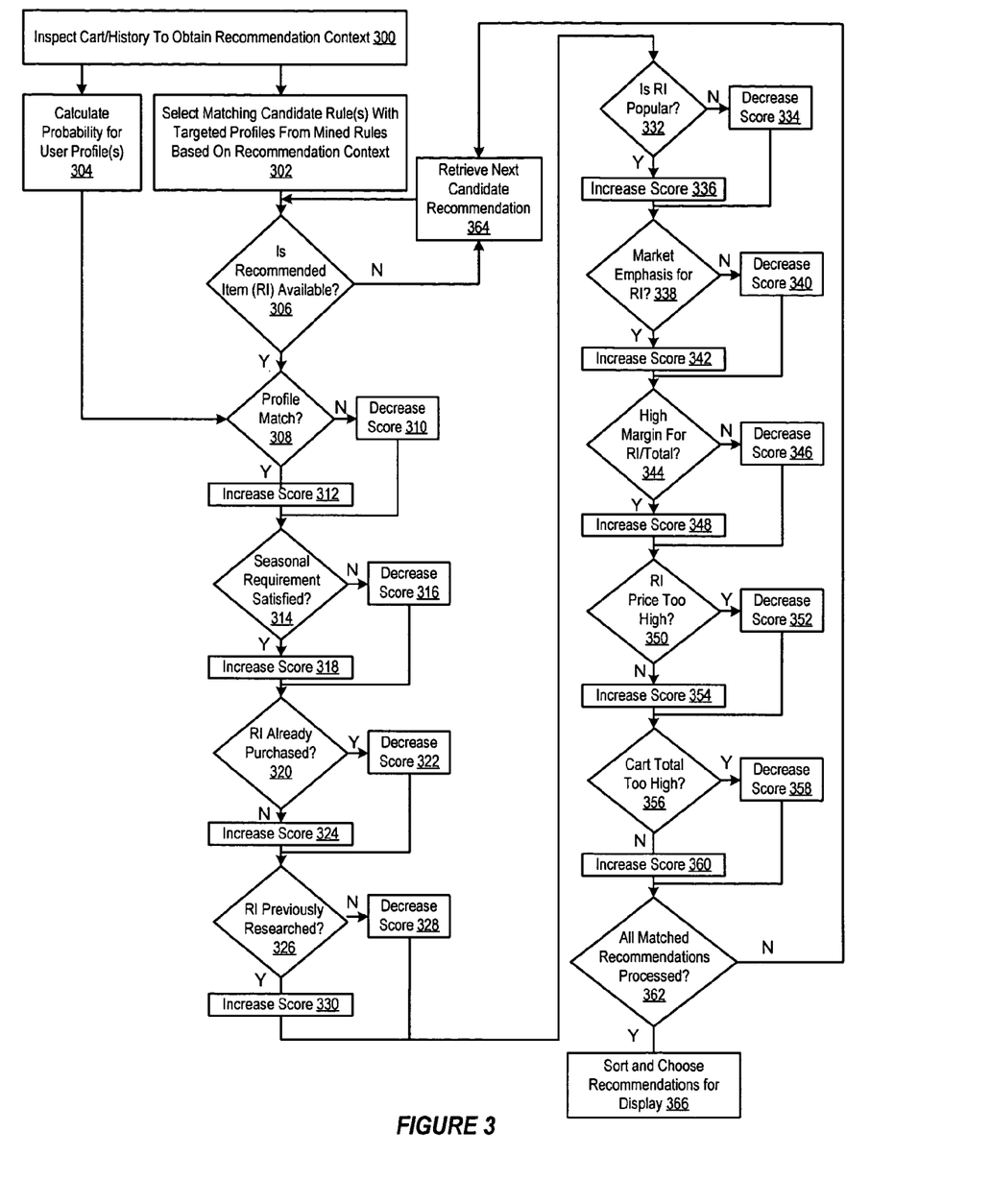
FIG. 3 shows a flowchart schematically illustrating a process for prioritizing retail recommendations using one or more scoring criteria according to various illustrative embodiments of the present invention.

Whichever scoring algorithm is applied, it will be appreciated that any one or more of the scoring criteria described herein may be used to score a candidate recommendation rule. Thus, FIG. 3 shows a flowchart schematically illustrating various process embodiments for prioritizing retail recommendations using one or more scoring criteria. Though selected embodiments of how to score candidate recommendation rules are illustrated in FIG. 3, it will be appreciated by those of ordinary skill in the art that the sequence of illustrated steps may be modified, reduced or augmented in keeping with the disclosure of the present invention. For example, any one or more of the scoring steps (e.g., the detection of whether a seasonal requirement of the recommended item is satisfied) may optionally be included or excluded. Thus, it will be appreciated that the methodology of the present invention may be thought of as performing the identified sequence of steps in the order depicted in FIG. 3, though the steps may also be performed in parallel, in a different order, or as independent operations that are combined to obtain a score for the candidate recommendation rule.

The description of the illustrative methodologies for prioritizing recommendations can begin at step 300, where the recommendation context is obtained. The mechanics of obtaining the recommendation context can be accomplished by a variety of ways, such as by retrieving quote information from the customer cart or by obtaining information from outside of a cart, such as from a simple product page, a configuration page, or even a user's click-path/browse-path/user session history. Using the recommendation context, the mined rules matching the recommendation context are selected as the candidate recommendation rule set at step 302, where each matching mined rule may include a targeted profile for that rule. At step 302, one of the candidate recommendation rules is selected as the candidate recommendation for scoring by the following steps.

As an optional preliminary step 306, the selected candidate recommendation may be assessed to determine if the item being recommended is in inventory and available for purchase. If the item is not available (negative outcome from decision 306), the prioritization methodology may remove the candidate recommendation from the candidate recommendation rule set and retrieve the next candidate recommendation, as indicated at step 364. However, a negative outcome from decision step 306 may instead indicate that a follow-up inquiry with the recommendation should be directed to the customer once the item is available. With an affirmative outcome from decision 306, the scoring process enters an equation phase where one or more scoring criteria are measured against the candidate recommendation.

For example, decision 308 determines whether the targeted profile from the candidate recommendation rule matches or corresponds with a user profile estimate that is calculated based on the recommendation context. In particular, the recommendation context information may be used to independently calculate a user profile or profile estimate for the customer at step 304, such as by using a Bayesian network approach for quantifying likelihood that the actual customer profile (indicated by the recommendation context) corresponds to one or more predetermined user profiles (such as "Digital Photography Enthusiast," "Mobile User" or the like). If the user profile estimate (from step 304) matches the targeted profile from the candidate recommendation rule (as indicated by affirmative outcome from decision 308), then the score for the candidate recommendation is adjusted (e.g., increased or decreased) at step 312. If there is no match (negative outcome to decision 308), then the score may not be adjusted, or may alternatively be decreased (step 310).

The seasonality of the recommendation may optionally be evaluated as part of the scoring process at step 314. For example, an item being recommended by the candidate recommendation may be identified at step 314 as a seasonal item by performing a lookup operation in a table of seasonal products. If the item is a seasonal item (e.g., Christmas gift) and the seasonal requirement is satisfied (e.g., by detecting that the current date falls within the Christmas shopping season), then an affirmative outcome from decision 314 causes the score for the candidate recommendation to be adjusted or increased (step 318). If the seasonal requirements are not met or if there is no seasonal requirement (negative outcome to decision 314), then the score may not be adjusted, or may alternatively be decreased (step 316).

Another scoring criterion may be the purchase status of the recommended item. For example, if it is detected that an item being recommended by the candidate recommendation has already been purchased (affirmative outcome from decision 320), then the score for the candidate recommendation may be adjusted (e.g., increased or decreased) at step 322, or alternatively the candidate recommendation may be removed altogether from the candidate recommendation rule set and the next recommendation may be retrieved. If the recommended item has not been purchased (negative outcome to decision 320), then the score may be increased (step 324).

The scoring process may also take into account the research status for the recommended item. For example, if it is detected that an item being recommended by the candidate recommendation has previously been researched by the customer (affirmative outcome from decision 326), then the score for the candidate recommendation may be adjusted (e.g., increased or decreased) at step 330. If the recommended item has not been the subject of prior customer research (negative outcome to decision 326), then the score may not be adjusted, or may alternatively be decreased (step 328). Alternatively, the implementer may instead choose to reverse these outcomes to increase the score if there has been no prior research, and to decrease the score if there has been prior research, based on the assumption that prior research without a purchase indicates lack of interest.

The popularity of the recommended item may optionally be evaluated as part of the scoring process at step 332. For example, an item being recommended by the candidate recommendation may be identified as a popular item by performing a lookup operation in a listing of the highest selling or high selling products. If the recommended item is a popular item (affirmative outcome from decision 332), then the score for the candidate recommendation may be adjusted (e.g., increased or decreased) at step 336. If the recommended item is not a popular item (negative outcome to decision 332), then the score may not be adjusted, or may alternatively be decreased (step 334).

Another scoring criterion may be the marketing status of the recommended item. For example, if it is detected that an item being recommended by the candidate recommendation is the subject of a marketing push, indicating that the item is currently being promoted over other items (affirmative outcome from decision 338), then the score for the candidate recommendation may be adjusted or increased (step 342). However, if the recommended item is not the subject of a marketing push (negative outcome from decision 338), then the score may be decreased (step 340) or may not be adjusted.

Of course, pricing and margin considerations may also be used to score a candidate recommendation. For example, if there is a high margin for the recommended item (or the total purchased items) exceeding a threshold margin amount (affirmative outcome from decision 344), then the score may be adjusted one way (e.g., increased at step 348); otherwise, the score may optionally be adjusted another way (e.g., lowered at step 346) if the margin is below a threshold (negative outcome from decision 344). Similarly, if the price for the recommended item is detected as being too high (affirmative outcome to decision 350), either as exceeding a threshold margin amount or as exceeding a ratio in relation to other purchased items, then the score may be adjusted one way (e.g., decreased at step 352); otherwise, the score may optionally be adjusted another way (e.g., increased at step 354). Likewise, if the total price for all items in the cart and the recommended item is too high or exceeds a threshold total cost amount (affirmative outcome to decision 356), then the score may be adjusted one way (e.g., decreased at step 358); otherwise, the score may optionally be adjusted another way (e.g., increased at step 360).

The scoring process continues with each candidate recommendation until all candidate recommendations have been scored (affirmative outcome from decision 362), at which time the scored candidate recommendations are ranked or sorted by score value to select one or more of the highest scored recommendations for display to the customer (step 366). As indicated above, one or more of the scoring criteria described herein may be used in a scoring equation to score the candidate recommendations, and the order of applying the scoring criteria may be altered in any way or applied in whole or in part in parallel. It will also be appreciated that other scoring factors and equations may be used to calculate the score of a candidate recommendation, including but not limited to the timeliness of a recommended item, related key product attributes (such as weight, portability, size, power, memory, etc.), and the like.

In addition to scoring each of the candidate recommendations, a selected embodiment of the present invention may also use an attribute of the recommended item or one or more of the identified scoring criteria to identify selling messages for each candidate recommendation or for only the candidate recommendation that has been selected for issuance as a recommendation by the scoring process, thereby avoiding the need to process selling messages for recommendation rules that are not issued. In this way, selling point text is provided that is dynamically tailored to the particular customer or item being recommended. This may be illustrated with reference to FIG. 1, where, in response to the list of completed recommendation rules (e.g., R1', R2', R3') being provided to the recommendation message generator 40, the message selector 44 determines the optimal selling point/message text for each candidate recommendation (e.g., R1') by using a profile estimate (derived from the recommendation context) and/or an attribute of the recommended item to index into a table of selling point text messages stored with the domain profiles 42. In a selected implementation, a lookup table approach may be used whereby a scoring criterion that applies to the candidate recommendation (e.g., an attribute or profile) is used to key into the lookup table in order to output a predetermined selling point text corresponding to that scoring criterion. With this approach, any specified scoring criteria (such as customer profile, seasonality, customer history, timeliness of a recommended item, marketing status, item popularity and the like) and/or product attributes associated with the recommended item (such as weight, portability, size, power, memory, etc.) may be used to select a selling point message text.

For example, if the recommended item (from the candidate recommendation) was a wireless mouse, the configuration (from the recommendation context) identified a laptop, and the specified scoring criteria included shopper profile of mobile professional, the selling message text might be "Enhance your laptop interaction flexibility and free yourself of wires with a <wireless mouse product name>." In contrast, if the recommended item was a wireless mouse, the configuration identified a workstation, and the specified scoring criteria included a shopper profile of home office, the selling message text might be "Save desk space and free yourself of wires with a <wireless mouse product name>."

An illustrative implementation for generating a specifically targeted selling point text may be illustrated with reference to FIG. 2, wherein the normalized transaction representation 255 is used by the message selection process 208 to select a selling point text 257 from the available domain profiles 256 that matches the profile of the customer generating the recommendation context 209. In this example, once a candidate recommendation is received by the recommendation message generator 207, the customer profile is calculated by a profile selection process 204 which uses normalized transaction data 255 to identify a customer profile from a plurality of predetermined profiles representing user demographics or classes, such as "Economy Buyer," "Power User," "Home Office," "Game Player," "Sophisticated User," "Technology Novice," and the like. Each predetermined profile in the database 256 may include an identification of goals and objectives typically associated with users fitting the profile. In addition and as explained more fully below, each of the domain profiles 257 may include a lead-in text, which describes the profile, a set of attributes (attributes-of-interest) that represent the product features that users take into account when making a purchase, and selling point text for each attribute-of-interest. The attributes-of-interest are those attributes that a member of the profile takes into consideration when deciding whether to purchase a product.

The profile selection process or algorithm 204 chooses or identifies one or more profiles from the domain profile database 256, based on the likelihood of matching the user profile indicated by the recommendation context 209. As part of the profile selection process, the profile selector 204 may provide a scoring functionality for scoring one or more domain profiles 257 in terms of the relative match to the recommendation context information 209. In a selected implementation, the profile scoring function ranks a given profile from the domain profile database 256 by using recommendation context data 209, such as click stream history and cart data, and the domain model schema 252 to generate a ranking value representing the likelihood that the given profile represents the recommendation context 209. Profile selection may also be based on attribute-value matching, whereby the profiles are described by a set of attributes of interest, and each attribute of interest has a range of attribute values that define the attribute values that are consistent with the profile. Given a recommendation context, the profile is selected that encloses the attribute values of the parts in the recommendation context. In addition, profile selection may be based on value functions, whereby a value function consisting of a weighted sum of the values of the attributes of interest is assigned to each profile. The weights represent the relative strength of the attribute towards defining the profile. The values of the attributes in the recommendation context are used in the value function to return a numeric value to each profile. The profile with the highest value is selected. When more than one profile is selected by the profile selector 204, the selected domain profiles 257 may be weighted in terms of the matching probability with the recommendation context 209 by the profile selection process 204. With such a probabilistic approach, probabilities are assigned to profiles in the profile database 256, given an assignment of values to the attributes of interest. The attribute values of the parts in the recommendation context 209 are input, and the profile(s) with the highest probability are selected.

However calculated, the customer profile may be used by the message selection process 208 to index into the selling point text table 257 to obtain a message text for the candidate recommendation. In addition or in the alternative, the message selection process 208 may use the attribute(s) of the recommended item or other scoring criteria 249 to select a text from the plurality of texts 257 for inclusion in the recommendation 260. The selected message text may then be associated with the candidate recommendation during the recommendation scoring and prioritization process 206 so that whichever candidate recommendations are ranked highest may be issued with the associated message text as recommendation 260. In this way, the selling point/message text included in the recommendation 260 is based on the selected profile and/or attributes-of-interest, and may include specific selling point text for certain attributes of the recommended item(s) which is used to inform the user why the recommended item is desirable or needed. The selling point/message text may also include a statement of intent or usage that represents the inferred profile of the user.

As an example, consider a "Digital Camera Novice" user profile. Users matching this profile are likely to be interested in an inexpensive camera (less than $300), with low resolution (2 MegaPixels or less), and are probably only interested in taking pictures and emailing those pictures to friends and family. The selling message generator 207 may act on these inferred interests of the "Digital Camera Novice" profile by detecting if the user has an inexpensive digital camera with low resolution in the recommendation context 209 and then identifying (such as by use of a lookup table) the user as a "Digital Camera Novice" with high probability. Based on such a detected profile, the recommendation engine 205 may be configured to avoid recommending digital image editing software to this type of user, and to instead recommend an inexpensive photo printer with a selling point message that is triggered by the detected profile. An example of the resulting recommendation message 260 is set forth below:

Profile lead-in text—"Easily print digital photos for yourself, family, and friends."

Selling-point text—"Very economical", "Fast color photo print speed", and "Crisp and clear 3×5 photos."

On the other hand, if the recommendation context 209 indicates that the user has already selected an expensive, high resolution camera and a high-quality photo printer, then the profile selector 204 would be configured detect that the user is a "Digital Photography Enthusiast," and based on this type of profile, the selling message generator 204 would issue a selling point/message text corresponding to the candidate recommendation (e.g., a digital image editing software) from the recommendation engine 205. The recommendation message 260 might look something like the following:

Profile lead-in text—"Take full advantage of your high quality digital camera images."

Selling-point text—"Edit, improve, and have fun with your digital images."

In an exemplary embodiment, the system and method for generating effective recommendations may be implemented with a data processing system that processes transaction database information to provide attribute-based association rules, to score and prioritize matching association rules using predetermined scoring criteria, and to generate selling point/ message texts in response to one or more of said scoring criteria. For example, data processing may be performed on computer system 210 which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 210 includes one or more microprocessor or central processing units (CPU) 212, mass storage memory 214 and local RAM memory 215. The processor 212, in one embodiment, is a 32-bit or 64-bit microprocessor manufactured by Motorola, such as the 680X0 processor or microprocessor manufactured by Intel, such as the 80X86, or Pentium processor, or IBM. However, any other suitable single or multiple microprocessors or microcomputers may be utilized. Computer programs and data are generally stored as instructions and data in mass storage 214 until loaded into main memory 215 for execution. Main memory 215 may be comprised of dynamic random access memory (DRAM). As will be appreciated by those skilled in the art, the CPU 212 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary skill in the art will recognize that the foregoing components and devices are used as examples for the sake of conceptual clarity and that various configuration modifications are common.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to improve the generation of attribute-based rules. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based data processing system described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: retail, enterprise and consumer electronics, general retailers, computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method of generating recommendations for potential purchase by a customer, comprising:
   generating association rules from a transaction history data set;
   receiving a recommendation context from a customer;
   using the recommendation context at a computer system to identify a plurality of candidate recommendation rules from the association rules that match the recommendation context, where each candidate recommendation rule recommends at least one recommended item;
   determining a score for each candidate recommendation rule using a margin value factor for the recommended item, a confidence value factor for the candidate recommendation rule and a predetermined scoring criteria factor;
   ranking the plurality of candidate recommendation rules using the score for each candidate recommendation rule to identify at least a highest ranking candidate recommendation rule; and
   issuing at least the highest ranking candidate recommendation rule as a recommendation.

2. The method of claim 1, further comprising generating a selling message for at least the highest ranking candidate recommendation rule by selecting from a plurality of selling point messages using an attribute from a customer shopping cart, from a customer history or from an item being recommended by the highest ranking candidate recommendation rule.

3. The method of claim 1, comprising generating a recommendation message to include in a recommendation by using a profile estimate calculated from the recommendation context to select a recommendation message from a table of selling point messages.

4. The method of claim 1, comprising generating a recommendation message by using at least one attribute from each candidate recommendation rule to select a selling message for that candidate recommendation rule from a table of selling point messages.

5. The method of claim 1, where the step of determining a score for each candidate recommendation rule comprises adjusting the predetermined scoring criteria factor if a profile estimate calculated from the recommendation context matches a target profile contained within the candidate recommendation rule.

6. The method of claim 1, where the step of determining a score for each candidate recommendation rule comprises multiplying the margin value factor, the confidence value factor and the predetermined scoring criteria factor to form the score.

7. The method of claim 1, where the step of determining a score for each candidate recommendation rule comprises adjusting the predetermined scoring criteria factor if the recommended item has not previously been purchased by the customer.

8. The method of claim 1, where the step of determining a score for each candidate recommendation rule comprises increasing the predetermined scoring criteria factor if the customer has previously researched the recommended item.

9. The method of claim 1, where the step of determining a score for each candidate recommendation rule comprises decreasing the predetermined scoring criteria factor if the customer has previously researched the recommended item.

10. The method of claim 1, where the step of determining a score for each candidate recommendation rule comprises adjusting the predetermined scoring criteria factor depending on whether a seasonal requirement for the recommended item is satisfied.

11. The method of claim 1, where the step of determining a score for each candidate recommendation rule comprises increasing the predetermined scoring criteria factor if there is a marketing emphasis for the recommended item.

12. The method of claim 1, where the step of determining a score for each candidate recommendation rule comprises increasing the predetermined scoring criteria factor if the recommended item is a popular item.

13. The method of claim 1, where the step of determining a score for each candidate recommendation rule comprises increasing the predetermined scoring criteria factor if the recommended item has a margin exceeding a predetermined margin threshold value.

14. The method of claim 1, where the step of determining a score for each candidate recommendation rule comprises increasing the predetermined scoring criteria factor if a combined margin value for the recommended item and any items already purchased by the customer exceeds a predetermined margin threshold value.

15. The method of claim 1, where the step of determining a score for each candidate recommendation rule comprises decreasing the predetermined scoring criteria factor if the recommended item has a price exceeding a predetermined price threshold value.

16. The method of claim 1, where the step of determining a score for each candidate recommendation rule comprises decreasing the predetermined scoring criteria factor if the recommended item has a price that exceeds a total price for previously purchased items by a predetermined factor.

17. The method of claim 1, where the step of determining a score for each candidate recommendation rule comprises decreasing the predetermined scoring criteria factor if a combined price value for the recommended item and any items already purchased by the customer exceeds a predetermined price threshold value.

18. The method of claim 1, further comprising issuing a second candidate recommendation rule as a recommendation, where the second candidate recommendation rule is not substitutable with the highest ranking candidate recommendation rule.

19. The method of claim 1, where the step of determining a score for each candidate recommendation rule comprises multiplying a confidence metric for the candidate recommendation rule by a margin value for the item recommended by the candidate recommendation rule.

20. The method of claim 1, wherein the predetermined scoring criteria is a profile estimate or a message strength value for a selling message associated with the candidate recommendation rule.

21. A system for generating purchase recommendations for a customer, comprising:
a database for storing a plurality of association rules;
means for identifying a plurality of candidate recommendation rules from the association rules that match a recommendation context associated with the customer, where each candidate recommendation rule recommends at least one recommended item;
means for scoring each candidate recommendation rule by calculating an expected margin value for the recommended item;
means for ranking the expected margin values for the candidate recommendation rules to identify a purchase recommendation for the customer; and
means for generating a selling message for the purchase recommendation by using a user profile to select from a plurality of selling messages based on an attribute of the recommended item associated with the recommended item recommended by the purchase recommendation.

22. An article of manufacture having at least one recordable medium having stored thereon executable instructions and data which, when executed by at least one processing device, cause the at least one processing device to:
use a recommendation context associated with a customer to identify a set of candidate association rules that match a recommendation context associated with a customer, where each candidate association rule recommends at least one recommended item;
calculate a score value for each candidate association rule using an expected margin value for each recommended item and one or more predetermined scoring criteria;
rank the set of candidate association rules using the score value for each candidate association rule; and
issue at least the candidate association rule having the highest score value as a purchase recommendation to a customer.

* * * * *